Patented Apr. 30, 1940

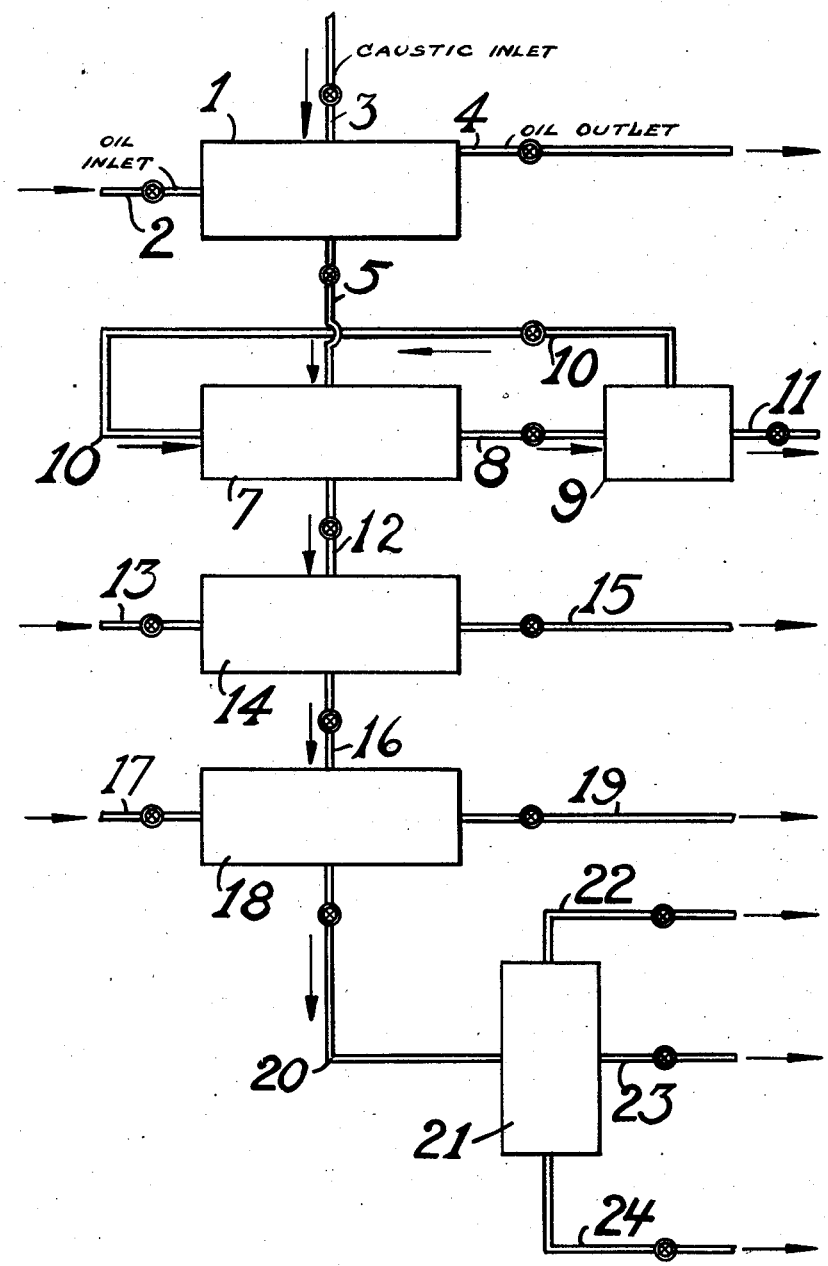

2,199,208

UNITED STATES PATENT OFFICE 2,199,208

PURIFICATION OF PETROLEUM PHENOLS

John J. Owen, Baton Rouge, La., assignor to Standard Oil Development Company, a corporation of Delaware Application March 30, 1939, Serial No. 264,989

9 Claims. (Cl. 260—627)

The present invention relates to an improved method of recovering phenols from petroleum oils. In accordance with the present invention, petroleum phenols containing substantially no impurities are produced by first treating a petroleum oil or petroleum oil extract with an alkali. The alkali sludge so obtained is treated in an initial stage with a solvent to remove oil from the alkali metal phenolates and then treated in a secondary stage with steam or inert gases at elevated temperatures at atmospheric or reduced pressure in order to remove substantially all the remaining oil. After removal of the oil and other impurities the phenols are recovered by acidification of the phenolates with a suitable acid and then distilled to recover particular phenol fractions.

It is known in the art to recover petroleum phenols from crude petroleum oils. These phenols are usually recovered from cracked petroleum naphtha distillates, heating oil stocks, as well as from various solvent extracts. In general, the petroleum fraction, as for example heating oil, is treated with a strong aqueous or alcoholic caustic solution in order to form alkali metal phenolates. The alkali metal phenolates in alkaline solution after separation from the oil, are then washed with a solvent such as petroleum ether or naphtha to remove residual hydrocarbons. The solution of the salts is then usually treated with carbon dioxide or a weak mineral acid in sufficient quantity to liberate only the phenols from the salts, and to prevent any naphthenic acid salts present from being acidified. The liberated phenols are separated from the solution and are then further purified by distillation, preferably under reduced pressures.

In these processes the use of petroleum ether as a solvent results in substantial removal of residual hydrocarbon oil from the alkali metal phenolate solution, and the phenols so produced are satisfactory to the trade. The use of petroleum ether, however, is attended by difficulties arising mainly from the high volatility of this solvent. Special equipment required for handling the volatile petroleum ether contributes substantially to the cost of producing the phenols. On the other hand, when naphtha is used as the solvent the phenols are not entirely satisfactory and cannot be used for many commercial purposes since the oil content of the phenols is relatively high. Furthermore, the phenols possess a distinctive petroleum odor which in many cases prohibits their use. This is especially true when it is desired to use the phenol for certain types of resins since it is essential that the phenols contain less than 1% of oil and possess no objectionable petroleum odor.

I have now discovered a process comprising a particular sequence of steps by which it is possible to economically produce high quality phenols from petroleum oils which do not possess the above named objectionable characteristics and which may be readily utilized in the production of high quality resins and the like. The process of my invention may be readily understood by reference to the attached drawing illustrating one modification of the same. A phenol-containing feed oil is introduced into contacting stage 1 by means of feed line 2 where it is treated with an alkali metal hydroxide solution introduced by means of feed line 3. The oil is removed from stage 1 by means of line 4. The extract of the oil is withdrawn from stage 1 and introduced into primary treating stage 7 by means of feed line 5. In primary treating stage 7 the oil-containing phenolates are solvent treated with a suitable solvent under conditions adapted to remove oil from the alkali metal phenolates. The solvent and dissolved oil are withdrawn from primary treating stage 7 by means of line 8 and introduced into a desolventizer 9. The solvent is removed by means of line 10 and recycled to primary stage 7, while the solvent-free oil is removed from desolventizer 9 by means of line 11. The alkali metal phenolate solution is withdrawn from primary stage 7 by means of line 12 and introduced into secondary treating stage 14. In this stage the alkali metal phenolate solution is subjected to treatment with steam or an inert gas under suitable temperature and pressure conditions adapted to remove substantially all the remaining oil from the alkali metal phenolate solution. The steam or inert gas are introduced into this stage by means of line 13 and removed with the remaining oil from this stage by means of line 15. The alkali metal phenolate solution substantially free of oil is removed from secondary treating stage 14 by means of line 16 and introduced into acidification stage 18. In acidification stage 18 the phenols are recovered from the phenolates by treating with a suitable acid reagent which is introduced by means of line 17. The aqueous layer is withdrawn by means of line 19. Free phenols are withdrawn from stage 18 by means of line 20 and are introduced into a fractionation stage 21 where the phenols are separated from higher boiling impurities. If desired, the phenol may be further fractionated to secure particularly desirable fractions, the respective fractions being withdrawn by means of lines 22, 23, and 24.

The conditions and method of operating in accordance with the present invention may be widely varied. In general, the conditions are so adjusted that the phenols contain less than 2%, preferaby less than 1%, of oil. The oil content is preferably determined by having the phenol products meet the test that they contain not more than 1% of unsaponifiable matter as determined by extraction of the sodium phenolates three times with one-half volume of petroleum ether.

The petroleum feed oil used may be any suitable petroleum oil containing petroleum phenols. In general, it is preferred to use petroleum oils boiling in the lubricating oil range or petroleum extracts which have been secured by solvent treating petroleum oils with solvents of the class of solvents which have a preferential selectivity for the more aromatic compounds as compared to the more paraffinic compounds. Solvents of this class are, for example, phenol, furfural, sulfur dioxide, cresol, nitro benzene, aniline, beta-beta-dichlor-diethyl ether and the like.

The phenol-containing petroleum oil or phenol-containing petroleum oil extract is treated with a suitable alkali, as for example, sodium or potassium hydroxide and the like, in order to form the alkali metal phenolates. The neutralizing temperature employed is preferably atmospheric, although other temperatures may be employed. The amount and concentration of the alkali used in the neutralization stage will be sufficient to cause substantially complete conversion of the phenols to the corresponding phenolates. In general, it is preferred to use from 0.02 to 0.05 volumes of alkali solution per volume of phenol-containing feed oil. Under these conditions the concentration of the alkali should preferably be in the range from 10% to 40%. It is to be understood that the concentration and amount of alkali will, of course, depend upon the concentration of the phenols in the phenol-containing petroleum oil. It is essential to secure high yields of purified phenols that an excess of alkali be employed in order to prevent the hydrolysis of the sodium phenolate to phenol and the corresponding alkali.

The solvent used to remove the oil from the neutralized alkali metal phenolates may be any suitable solvent which will remove most of the oil from the phenolates. In general, solvents of the class of lower boiling petroleum hydrocarbons are employed, specific examples of which are solvent naphtha and gasoline. The quantity of solvent used in the primary treating stage will depend upon the particular solvent being used and the petroleum oil being dissolved. In general, it is preferred to use from one-half to four volumes of solvent per volume of feed oil. The temperature and pressure conditions employed in the solvent treating step likewise depend upon the particular solvent used and the feed oil being separated from the alkali metal phenolates. In general, it is preferred to use atmospheric pressure and a temperature in the range from 80° F. to 120° F.

The process of the present invention, however, is particularly applicable when a petroleum naphtha boiling in the gasoline range is employed. Particular solvents of this class are naphthas which may be readily used at atmospheric pressure and temperatures without undue loss of the solvent, such as varsols, heavy naphthas, and the like. The alkali metal phenolates, after removal from the solvent, are then subjected in a secondary treating stage to treatment with steam or inert gases at elevated temperature and at atmospheric or reduced pressures. Especially desirable results are secured when the alkali metal phenolates are treated with steam at atmospheric pressure, although reduced pressures may be employed. If an inert gas, as for example, nitrogen or air, is employed it is preferred to use atmospheric or reduced pressures and a temperature of about the boiling point of the solution at the pressure used. The quantity of steam or inert gas employed will, of course, depend upon the temperature and pressure employed, as well as upon the particular alkali metal phenolates being purified. If steam is employed, it is preferred to use from one to 5 (condensed) volumes of steam per volume of alkali metal phenolates. The alkali metal phenolates are blown for a period sufficient to cause substantially complete removal of the oil from the phenolates. As an alternative to blowing with steam, it is sometimes preferable, particularly when working with rather dilute solutions of alkali metal phenolates, to generate the steam from the aqueous solvent itself, such as by heating the solution and flashing a portion of the solvent. The steam or air treated sodium phenolates are then acidified by treating with any suitable acid. In general, it is preferred to regenerate the phenols by treating with carbon dioxide. The liberated phenols are then separated from the aqueous solution. In general, it is preferred to distill the separated phenols under suitable fractionating conditions.

In order to illustrate the invention, the following examples are given which should not be construed as limiting the invention in any manner whatsoever:

Example 1

A sludge solution was obtained by treating a heating oil containing phenolic type compounds with 2% of sodium hydroxide of 40% concentration. The caustic sludge containing sodium phenolates was then extracted with light naphtha boiling in the range between about 185° F. and 287° F. The caustic sludge was extracted four successive times with this solvent using one-half volume of solvent per volume of caustic sludge for each extraction.

The oil content of the extracted sludge was then determined by the petroleum ether extraction test*. The oil removed in the respective extracting operations was as follows:

| | Percent oil removed | |
|---|---|---|
| | Based on extracted sludge | Based on phenols |
| Extraction 1, with petroleum ether | 5.53 | 11.60 |
| Extraction 2, with petroleum ether | 1.03 | 2.16 |
| Extraction 3, with petroleum ether | 0.29 | 0.61 |
| | 6.85 | 14.37 |

*Petroleum ether extraction test.—The oil content of phenols is determined by treating phenols with petroleum ether in three successive extractions, using one-half volume of petroleum ether per volume of sodium phenolate per extraction.

From the above data it is readily apparent that considerable oil remains in the phenol after extraction with light naphthas.

Example 2

Another portion of the caustic sludge of Example 1 was solvent extracted six successive times with a solvent naphtha boiling in the range between about 195° F. and 240° F. The oil content of the extracted sludge by the petroleum ether test was found to be as follows:

|  | Percent oil removed | |
| --- | --- | --- |
|  | Based on extracted sludge | Based on phenols |
| Extraction 1, with petroleum ether | 3.94 | 8.26 |

Example 3

Another portion of the caustic sludge of Example 1 was extracted seven successive times with gasoline boiling in the range from about 195° F. to 287° F. The extracted sludge was then steam stripped with 213% of steam based on phenols. The oil content as determined by the petroleum ether extraction test was as follows:

|  | Percent oil removed | |
| --- | --- | --- |
|  | Based on extracted sludge | Based on phenols |
| Extraction 1, with petroleum ether | 0.35 | 0.74 |

From the above data it is apparent that if the caustic sludge prior to acidification is treated with steam in accordance with the present invention, it is possible to produce purified phenols containing less than about 1% of impurities.

Example 4

Another portion of the caustic sludge of Example 1 was steam stripped without prior naphtha extraction. Approximately 476% of steam based on phenols was used at a pressure of 6 mm. of mercury. The oil content of the phenols was as follows:

|  | Percent oil removed | |
| --- | --- | --- |
|  | Based on extracted sludge | Based on phenols |
| Extraction 1, with petroleum ether | 2.1 | 4.5 |

From the above data it is apparent that steam stripping without prior naphtha extraction is not an effective method of deoiling phenols.

The present invention is not to be restricted in any manner whatsoever, but only by the following claims in which it is desired to claim all novelty insofar as the prior art permits.

I claim:

1. Process for the production of petroleum phenols comprising contacting a phenol-containing petroleum oil with an alkali, separating the oil from the resulting alkali metal phenolates, extracting said alkali metal phenolates with an oil solvent, blowing the extracted phenolates with a gas and then regenerating the phenols by acidification.

2. Process in accordance with claim 1 in which said gas is steam.

3. Process in accordance with claim 1 in which said alkali is sodium hydroxide.

4. Process in accordance with claim 1 in which said solvent is a hydrocarbon liquid boiling within the range of 150° F. to 350° F.

5. Process in accordance with claim 1 in which the phenols are regenerated by treating with carbon dioxide.

6. Process for the production of oil-free phenols from petroleum oil comprising contacting a phenol-containing petroleum oil with sodium hydroxide, separating the sodium phenolates and extracting the same with a naphtha boiling in the gasoline range, separating the naphtha-treated phenolates from the naphtha, subjecting the phenolates to treatment by blowing with steam followed by converting the phenolates to corresponding phenols by treatment with carbon dioxide.

7. Process in accordance with claim 6 in which said steam is generated by flashing a portion of the aqueous solvent.

8. Process for the production of petroleum phenols comprising contacting a phenol containing petroleum oil with an alkali, separating the oil from the resulting alkali metal phenolates, extracting said alkali metal phenolates with an oil solvent, blowing the extracted phenolates with a gas and then regenerating the phenols by treating said phenolates with a mineral acid.

9. Process in accordance with claim 8 in which said acid is a weak mineral acid.

JOHN J. OWEN.